US009609131B2

United States Patent
Placiakis et al.

(10) Patent No.: US 9,609,131 B2
(45) Date of Patent: *Mar. 28, 2017

(54) ACTIVITIES ASSIGNMENT OPTIMIZATION FOR MULTI-SKILL CONTACT CENTER

(71) Applicant: Genesys Telecommunications Laboratories, Inc., Daly City, CA (US)

(72) Inventors: Vidas Placiakis, Walnut Creek, CA (US); Herbert Ristock, Walnut Creek, CA (US); Nikolay Korolev, Concord, CA (US); Merijn te Booij, Daly City, CA (US); Vitaliy Teryoshin, Danville, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,365

(22) Filed: Oct. 5, 2015

(65) Prior Publication Data

US 2016/0028893 A1  Jan. 28, 2016

Related U.S. Application Data

(63) Continuation of application No. 13/960,627, filed on Aug. 6, 2013, now Pat. No. 9,154,627.

(60) Provisional application No. 61/822,900, filed on May 13, 2013.

(51) Int. Cl.
*H04M 3/00* (2006.01)
*H04M 3/523* (2006.01)
*H04M 3/51* (2006.01)

(52) U.S. Cl.
CPC ....... *H04M 3/5233* (2013.01); *H04M 3/5175* (2013.01)

(58) Field of Classification Search
CPC .. H04M 3/5175; H04M 3/523; H04M 3/5233; H04M 3/5232
USPC ........................... 379/265.01–265.02, 265.12
See application file for complete search history.

(56) References Cited

U.S. PATENT DOCUMENTS

| | | | |
|---|---|---|---|
| 5,903,641 A | 5/1999 | Tonisson | |
| 5,937,051 A | 8/1999 | Hurd et al. | |
| 6,044,355 A | 3/2000 | Crockett et al. | |
| 6,185,292 B1 | 2/2001 | Miloslavsky | |
| 6,449,358 B1 | 9/2002 | Anisimov et al. | |
| 7,701,925 B1 | 4/2010 | Mason et al. | |
| 7,706,523 B2 | 4/2010 | Agusta | |
| 2002/0110113 A1 | 8/2002 | Wengrovitz | |

*Primary Examiner* — Rasha Al Aubaidi
(74) *Attorney, Agent, or Firm* — Lewis Roca Rothgerber Christie LLP

(57) ABSTRACT

A system and method for setting agent cross skill enablement levels in a contact center. In one embodiment, a series of simulations is performed to determine optimum cross skill enablement levels for various circumstances, e.g., the number of agents, the proficiency of each agent at each of a number of skills, and the rates of incoming interaction requests requiring each of various skills. A lookup table is created which is subsequently used, during configuration of the contact center prior to operation, or in real time during operation, to adjust agent cross skill enablement levels.

18 Claims, 8 Drawing Sheets

ACTIVITIES ASSIGNMENT OPTIMIZATION FOR MULTI-SKILL CONTACT CENTER

CROSS-REFERENCE TO RELATED APPLICATION(S)

This application is a continuation of U.S patent application Ser. No. 13/960,627, filed on Aug. 6, 2013, now U.S Pat. No. 9,154,627, which claims priority to and the benefit of U.S. Provisional Application No. 61/822,900; filed May 13, 2013, entitled "ACTIVITIES ASSIGNMENT OPTIMIZATION FOR MULTI-SKILL CONTACT CENTER" the entire contents of which are incorporated herein by reference.

FIELD

The following description relates to contact center configuration and more particularly to a system and method for setting agent cross skill enablement in a contact center with agents having multiple skills.

BACKGROUND

In a contact center agents may be called upon to handle various customer issues. An agent may be trained in one or more skills, and the agent may have varying degrees of proficiency In each of the skills. When an end user contacts the contact center for help with an issue, it is advantageous to connect the end user with an agent who is highly proficient in skills related to the issue, hut all such agents may be occupied, and another agent, with inferior proficiency, may be available. In such a situation, the contact center routing system must decide whether to connect the end user immediately to the available agent, or to wait until a more proficient agent becomes available. Thus, there is a need for an approach to routing in a contact center with multi-skilled agents.

SUMMARY

According to an exemplary embodiment of the present invention, a series of simulations is performed to determine optimum cross skill enablement levels for various circumstances, e.g., the number of agents available, the proficiency of each agent at each of a number of skills, and the rates of incoming interaction requests requiring each of various skills, A lookup table is created which, is subsequently used, during configuration of the contact center prior to operation, or in real time during operation, to adjust agent cross skill enablement levels.

According to an embodiment of the present invention there is provided a system, including: a processor; and a memory, wherein the memory has stored thereon instructions that, when executed by the processor, cause the processor to: compute an agent cross skill enablement level in a contact center, in response to a routing strategy used in the contact center.

In one embodiment, the computing includes executing a plurality of simulations using the routing strategy and over a range of enablement levels, to determine a set enablement level the set enablement level being an enablement level which, reduces the number of agents required to meet a contact center performance level, as defined by a metric.

In one embodiment, the metric is an average speed of answer (ASA).

In one embodiment, the system includes storing the set enablement level in a lookup table.

In one embodiment, the executing of the plurality of simulations includes executing a set of simulations of the plurality of simulations for a plurality of assumptions about a number of agents having a first, skill as a primary skill and a second skill as a secondary skill and for a plurality of assumptions about a number of agents having the second skill as a primary skill.

In one embodiment, the executing of the plurality of simulations includes executing a set of simulations of the plurality of simulations using an assumption that incoming interaction requests arrive in at random points in time, the random points in time being characterized by a Poisson distribution.

In one embodiment, the executing of the plurality of simulations includes executing a set of simulations of the plurality of simulations using an assumption that, agent handling times for interactions take random values, the random values being characterized by an exponential distribution.

In one embodiment, the routing strategy is a prompt "X" routing strategy.

In one embodiment, the routing strategy is a delayed "X" routing strategy.

According to an embodiment of the present invention there is provided a method, including: computing, by a computing device, an agent cross skill enablement level, in a contact center, in response to a routing strategy used in the contact center.

In one embodiment, the computing includes executing a plurality of simulations using the routing strategy and over a range of enablement levels, to determine a set enablement level, the set enablement level being an enablement level which reduces the number of agents required to meet a contact center performance level, as defined by a metric.

In one embodiment, the metric is an average speed of answer (ASA).

In one embodiment, the method includes storing the set enablement level in a lookup table.

In one embodiment, the executing of the plurality of simulations includes executing a set of simulations of the plurality of simulations for a plurality of assumptions about a number of agents having a first skill as a primary skill and a second skill as a secondary skill and for a plurality of assumptions about a number of agents having the second skill as a primary skill.

In one embodiment, the executing of the plurality of simulations includes executing a set of simulations of the plurality of simulations using an assumption that incoming interaction requests arrive in at random points in time, the random points in time being characterized by a Poisson distribution.

In one embodiment, the executing of the plurality of simulations includes executing a a set of simulations of the plurality of simulations using an assumption that agent handling times for interactions take random values, the random values being characterized by an exponential distribution.

In one embodiment, the routing strategy is a prompt "X" routing strategy.

In one embodiment, the routing strategy is a delayed "X" routing strategy.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a system and method for activities assignment optimization in a multi-skill contact center provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
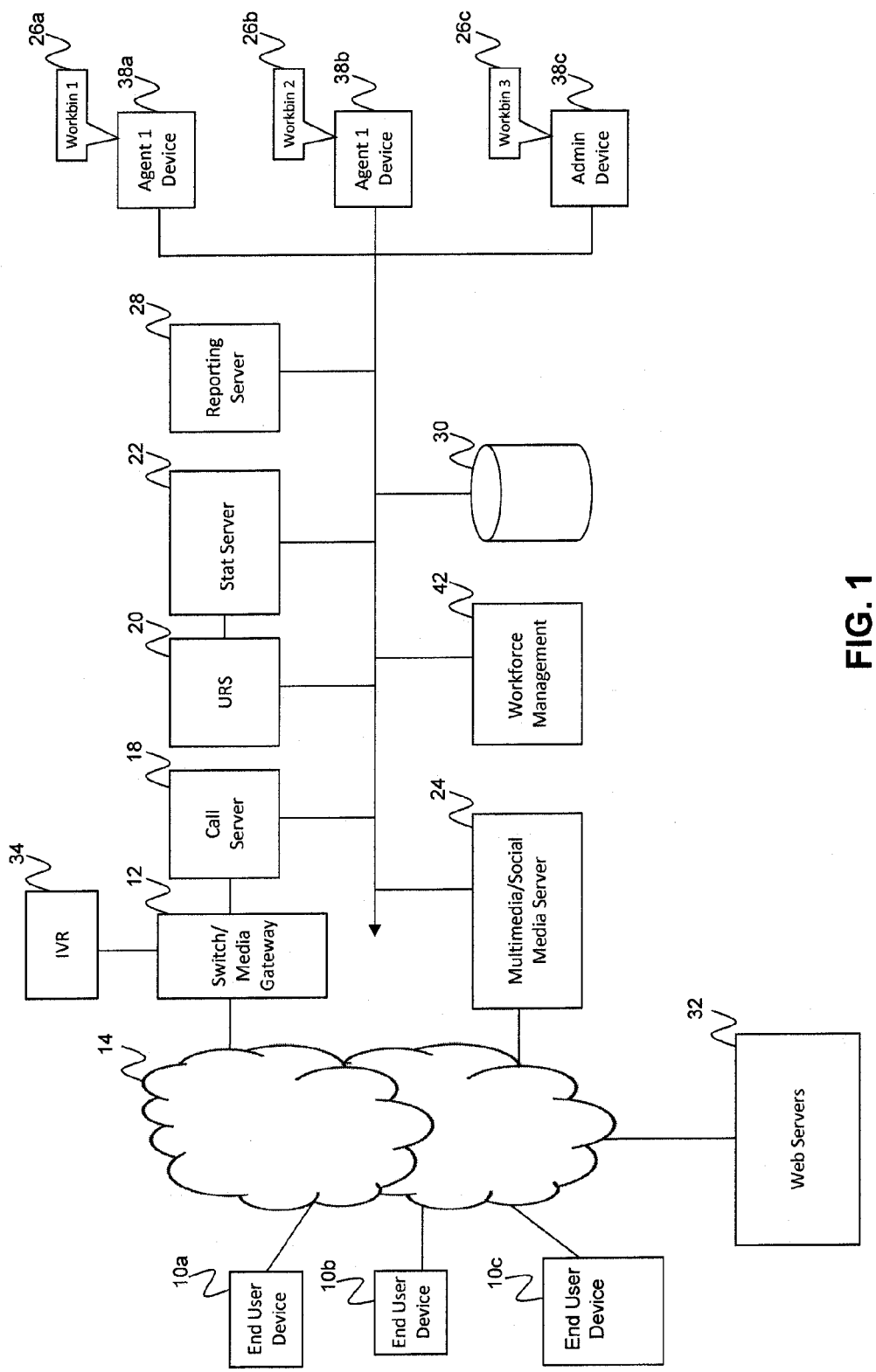
FIG. 1 is a block diagram of a contact center according to an embodiment of the present invention.

FIG. 1 is a schematic block diagram of a system supporting a contact center according to one exemplary embodiment of the invention. In one embodiment, the system is configured to distribute information and task assignments related to Interactions with end users (also referred to as customers), to employees of an enterprise. These task assignments are referred to herein as work items. The contact center may be an in-house facility of the enterprise and may serve the enterprise in performing the functions of sales and service relative to the products and services available through the enterprise. In another exemplary embodiment, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as end users) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. The mechanisms of contact, and the corresponding user devices 10, need not be limited to real-time voice communications as in a traditional telephone call, but may be non-voice communications including text, video, and the like, and may include email or other non-real-time means of communication. This generalized form, of a contact between an end user and the contact center, which may include methods of communication other than voice, and an endpoint other than a telephone, is referred to herein as an interaction.

Inbound and outbound interactions from and to the end user devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network, including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting interactions and/or data between end users and the contact center. The switch/media gateway 12 may include a telephony switch, configured, to function as a central switch for agent level routing within the center. In this regard, the switch/media gateway 12 may include an automatic interaction distributor, a private branch exchange (PBX), an IP-based software switch, and/or any other switch configured to receive Internet-sourced interactions and/or telephone network-sourced interactions. According to one exemplary embodiment of the invention, the switch is coupled to a call server 18 which may, for example, serve as an adapter or interface between the switch/media gateway 12 and the remainder of the routing, monitoring, and other interaction-handling systems of the contact center.

The contact center may also include a multimedia/social media server 24, which may also be referred to as an interaction server, for engaging in media interactions other than voice interactions with the end user devices 10 and/or web servers 32. The media, interactions may be related, for example, to email, chat, text-messaging, web, social media, and the like. The web servers 32 may include, for example, social interaction site hosts for a variety of known social interaction sites to which an end user may subscribe, such as, for example, FACEBOOK™, TWITTER™, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled, to an interactive voice response (IVR) server 34. The IVR server 34 is configured, for example, with an IVR script for querying customers on their needs. For example, a contact center for a bank may tell callers, via the IVR script, to "press 1" if they wish, to get an account balance. If this is the case, through continued interaction, with the IVR, customers may complete service without needing to speak with an agent.

If the interaction is to be routed to an agent, the interaction is forwarded to the call server 18 which interacts with a routing server, referred, to as a Universal Routing Server (URS) 20, for finding the most appropriate agent for processing the interaction. The call server 18 may be configured to process PSTN calls, VoIP calls, and the like. For example, the call server 18 may include a session initiation protocol (SIP) server for processing SIP calls. In another exemplary embodiment, the call server 18 may include a telephony server (T-server).

In one example, while an agent is being located and until such agent becomes available, the call server may place the interaction in an interaction queue. The interaction queue may be implemented via any data structure conventional in the art, such as, for example, a linked list, array, and/or the like. The data structure may be maintained, for example, in buffer memory provided by the call server 18.

Once an appropriate agent Is located and available to handle a call, the call is removed from the call queue and transferred to the corresponding agent device 38*a*-38*b*. Collected information about the caller and/or the caller's historical, information may also be provided to the agent device for aiding the agent in better servicing the call. The information may also be provided to a stakeholder device 38*c* for monitoring and training purposes. A stakeholder may be a contact center manager or a supervisor of one or more agents. Stakeholders need not be contact center employees; a product manager employed by the same enterprise, or by another enterprise supported by the contact center, may for example be a stakeholder. Each agent/stakeholder device 38*a*-*e* may include a telephone adapted for regular telephone calls, VoIP calls, and the like. The agent and stakeholder devices 38*a*-*e* may also include a computer for communicating with, one or more servers of the contact center and performing data processing associated with contact, center operations.

The selection of an appropriate agent for routing an inbound interaction (e.g. a telephony call or other multimedia interaction) may be based, for example, on a routing strategy employed by the routing server 20, and further based on information about agent availability, skills, agent location, and other routing parameters provided, for example, by a statistics (star) server 22. For example, the stat server 22 may accumulate data about places, agents, and place/agent groups, convert the data into statistically useful, information, and pass the calculations to other software applications. According to one embodiment, the stat server 22 may provide information to the routing server about agents' capabilities in terms of interactions they are handling, the media type of an interaction, and so on.

An exemplary routing strategy employed by the routing server 20 may be that if a particular agent, agent group, or department is requested, the interaction is routed to the requested agent, agent, group, or department as soon the requested entity becomes available. If a particular agent has not been requested, the interaction may be routed to agents with the requested skill as soon as those agents become available. The interaction may be placed into a queue, or for deferred media, the interaction may be placed in a workbin associated with a back-office agent group or department. In some embodiments, the interaction may be routed directly to agents for immediate processing. In this regard, the routing server 20 may be enhanced with functionality for managing back-office/offline activities that are assigned to enterprise employees. Such activities may include, for example, responding to emails and letters, attending training seminars, or performing any other activity (whether related to the contact center or not) that does not entail synchronous, real-time communication with end users. For example, a non-contact center activity that may be routed to a knowledge worker may be to fill out forms for the enterprise, process claims, and the like. Once a work item is assigned to an agent, the work item may appear in the agent's workbin 26*a*-26*b* (collectively referenced as 26) as a work item to be completed by the agent. The agent's workbin may be implemented via any data structure conventional in the art, such as, for example, a linked list, array, and/or the like. The workbin may be maintained, for example, in buffer memory of each agent's computer device. A stakeholder device 38*c* may also have an associated workbin 26*c* storing work items for which the stakeholder is responsible. Work items may be assigned to various targets, including, as described above, agents and stakeholders, including other persons associated with an enterprise, and including non-human targets such as a servers or computing devices. For example, the assignment of a work item to a target may have the effect of activating a particular email, or a voice response announcing, "You are complaining about a slow internet connection. We are experiencing a problem in your area, and are working to resolve it."

The multimedia/social media server 24 may also be configured to provide, to an end user, a mobile application for downloading onto the end user device 10. The mobile application may provide user configurable settings that indicate, for example, whether the user is available, not available, or availability is unknown, for purposes of being contacted by a contact center agent. The multimedia/social media server 24 may also monitor the status settings.

The contact center may also include a reporting server 28 configured to generate reports from data aggregated by the stat server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/stakeholder, contact center application, and/or the like).

According to one exemplary embodiment of the invention, the contact center also includes a mass storage device 30 for storing data, related to contact center operations such as, for example, information related to agents, customers, customer interactions, and the like. The mass storage device may take the form of a hard disk or disk array as is conventional in the art.

Each of the various servers in the contact center may be a process or thread, running on one or more processors, in one or more computing devices 500 (e.g., FIG. 5A, FIG. 5B), executing computer program instructions and interacting with other system, components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

A workforce management (WMF) system 42 may be an off-line tool or service for scheduling agents so that the contact center will, be stalled with, an adequate number of agents with a suitable mix of skills. In one embodiment the WMF system may also participate in the real-time operation of the contact center, for example enabling or disabling agent skills in the contact center configuration, or blocking the agents from handling interactions requiring certain skills, as described in additional detail below.

Agents in the contact center may have varying degrees of proficiency in various skills, and an agent may have a primary skill and a secondary skill. For example, in a contact center operated by or for a banking enterprise, a first agent may principally possess training and experience related to mortgages, and the agent may have some familiarity with credit cards as well; this agent's primary skill may therefore be mortgages and the agent's secondary skill may be credit cards. A second agent may primarily have skills related to credit cards, and secondary skill related to mortgages. An agent's level of skill may be measured by the agent's average handling time (AHT) for interactions requiring that skill. For example, the first agent may have an AHT of 20 minutes for mortgage-related interactions and an AHT of 10 minutes for interactions related to credit cards. The second agent may have a shorter AHT for interactions related to credit cards, e.g., 5 minutes, and a longer AHT, e.g., 30 minutes, for interactions related to mortgages. Mortgage related interactions may result in longer AHTs for both agents because such interactions may inherently be more time consuming than interactions related to credit cards. Average holding time may also be measured or calculated for an agent group; e.g., a group of agents specializing in mortgages may have an AHT, for the agent group, of 20 minutes for mortgage-related interactions, and an AHT, for the agent group, of 10 minutes for credit-card-related interactions. In one embodiment, an agent's proficiency, or the average proficiency of an agent group, in a particular skill may be measured by other metrics in addition to, or instead of, AHT. AHT may be an imperfect metric because, for example, an agent may be able to complete interactions quickly by discouraging the end user from prolonging the interaction but the agent may also thereby compromise end user satisfaction. Thus, customer satisfaction, or a metric which combines customer satisfaction and AHT may, for example, be used as a measure of agent proficiency.

During operation, a contact center may have several pools of agents working, each pool with a different combination of skills. The contact center may employ a routing strategy in routing interaction requests to agents. FIGS. 2A-2E show several possible routing strategies for routing interaction requests from interaction queues to agent pools. For example, FIG. 2A may represent a situation in which a contact center has two interaction queues, one for mortgage-related interaction requests, and one tor interaction requests related to credit cards. The queues may be established as a result of the contact center having a first phone number for mortgage service and a different phone number for credit card service, or as a result of each caller indicating dining an interaction with an IVR server 34 whether the call relates to a mortgage issue or a credit card issue.

Figure 2:
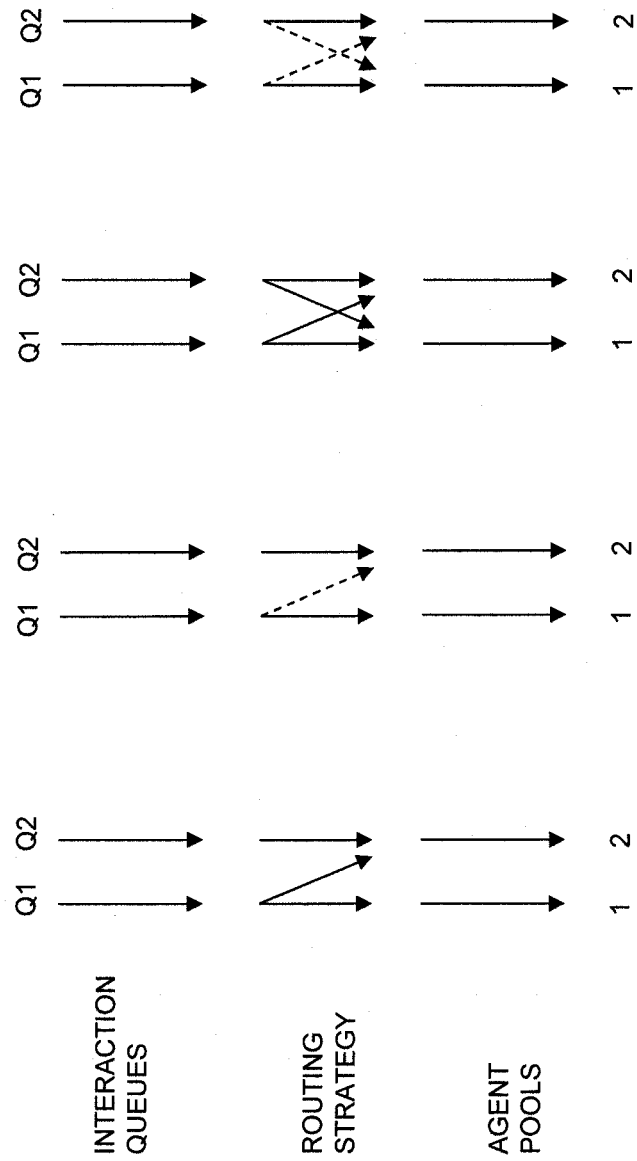
FIG. 2A is a routing diagram for a routing strategy according to an embodiment of the present invention.
FIG. 2B is a rooting diagram for a routing strategy according to an embodiment of the present invention.
FIG. 2C is a routing diagram for a routing strategy according to an embodiment of the present invention.
FIG. 2D is a routing diagram for a routing strategy according to an embodiment of the present invention.

In a routing strategy illustrated in FIG. 2A, a first interaction queue Q1 may be a queue of interaction requests related to mortgages and a second queue Q2 may be a queue of interaction requests related to credit cards, and the first pool of agents may be a pool of agents with mortgages as their primary skill, and the second pool of agents may be a pool of agents with credit cards as their primary skill and mortgages as their secondary skill, in this case, the routing server 20 may route every interaction request in the second queue Q2 to the second pool of agents and every interaction in the first queue Q1 to the first agent available in either the first pool or the second pool.

The routing strategy of FIG. 2A may not result in optimal performance. For example, an agent in the second pool may have sufficiently poor proficiency in a secondary skill that an end user would be better served waiting for an agent in the first pool than being helped immediately by an agent in the second pool. Moreover, when an interaction request is routed to an agent with low proficiency in the topic of the interaction, the agent may be occupied for a long time, and unable to handle other interactions related to topics in which the agent has high proficiency. To compensate for this inefficiency, it may be necessary to schedule a larger number of agents in the second pool.

The likelihood of this undesirable outcome, e.g., of having an end user served by an agent with inferior proficiency when the end user could have instead waited a short time to be served by a high proficiency agent, may be reduced by changing the respective sizes of the agent pools. Agent skills may be enabled in a contact center configuration by a manager, who may decide, for example that a particular agent has sufficient proficiency with mortgages that mortgage skills may be enabled, in configuration, for that agent. Enabling the agent's mortgage skills in this manner does not change the agent's proficiency; it merely changes the contact center configuration data so that, e.g., the routing server 20 may route interaction requests related to mortgages to that agent. Enabling a skill for an agent increases by one the size of the pool of agents with that skill; for example, enabling mortgages as a secondary skill for an agent whose primary skill is credit cards increases by one the number of agents in the second pool, in the example discussed above for FIG. 2A. By enabling a secondary skill for fewer agents, a contact center manager may reduce the likelihood that an end user will be served by an agent with inferior proficiency. In the example discussed above for FIG. 2A, if few agents are in the second pool, i.e., few agents have mortgages enabled as a secondary skill, then it is less likely that a user agent calling about a mortgage will be connected to an agent in the second pool, and more likely that an agent in the first pool will become available first, and serve the end user.

Thus there may be an optimal cross skill enablement level, e.g., an optimum fraction of agents who have a secondary skill in mortgages and who have this skill enabled as a secondary skill in the contact center configuration. Contact center performance may be measured according to various metrics, such as the average speed of answer (ASA) end users experience when contacting the contact center, or the fraction of calls answered within 20 seconds (for which there may be a goal or requirement of 80%). Requirements on these metrics may be referred to as service objectives and may be specified in a service level agreement (SLA). In one embodiment, a manager may run a plurality of simulations on a computing device to determine the optimum level of cross skill enablement, and then enable agent skills accordingly. Such a simulation may simulate randomly received, Poisson-distributed incoming interactions, and exponentially distributed handling times, using pseudorandom numbers to simulate, e.g., random interaction requests in a contact center, and using proficiency measures, such as AHT, defined at the agent group level. A simulation may be repeated multiple times with different trial values for cross skill enablement, and for each iteration, the contact center performance, e.g., the ASA, may be recorded. The cross skill enablement value resulting in the best ASA may then be chosen. In one embodiment the selection of trial values of cross skill enablement may be conducted in accordance with a gradient, descent method or other numerical optimization method known to those of skill in the art. Contact center service objectives, e.g., ASA, may be improved using this approach, or the number of agents needed to achieve certain contact center objectives may be reduced, freeing up some agents to perform other tasks.

In one embodiment, a series of simulations may be used to generate a lookup table for set levels (e.g., optimal levels) of cross skill enablement as a function of various parameters, e.g., the relative degree of proficiency the agents have in primary and secondary skills, the number of agents available with a given primary skill and with, a given secondary skill, and the rates, measured, e.g., by the Poisson arrival rates, of interaction, requests related to the respective skills. The lookup table may then be used by a contact center manager to schedule an appropriate mix of agents, or to schedule mid-shift breaks for agents, or to enable secondary skills for agents. In one embodiment, a simulation or a set of simulations or a lookup table may be used automatically and dynamically by a computing device in the contact center to change cross skill enablement in real time, during operation. The use of a lookup table may be advantageous when proficiency levels in primary and secondary skills are defined at the agent group level. Enablement of a skill for an agent may include several aspects, such as administrative enablement and blocking. Administrative enablement, may refer to the action of a contact center manager, who may enable or disable agent skills when agents are hired or trained, or to optimize cross skill enablement. Blocking may be performed dynamically at run time, e.g., automatically by algorithms in the contact center, which may, for example, block an interaction request from being routed to an agent having the required skill as a secondary skill when the number of agents employing that secondary skill has reached a maximum allowable level. In this framework an agent skill is enabled only if it is administratively enabled and not blocked. Blocking may be performed by a routing server 20. The use of blocking may be more flexible, because it may be capable of adjusting to unexpected changes both in agent availability (e.g. a certain portion of scheduled agents may be reassigned to training) and also to changes in interaction mix (which might be different from what was forecasted/assumed at scheduling time). On the other hand, not using blocking may be more convenient for agents because they may know up front about their actual tasks assignment, e.g. an agent who is scheduled only for primary skill tasks could be sure to not receive tasks for her or his secondary skill.

Referring to FIG. 2B, a routing strategy need not invariably route an interaction request to the first agent available with any proficiency in the subject of the interaction request. An alternate routing strategy consists of waiting first for a certain time interval, e.g., 10 seconds, for an agent having the necessary skill as a primary skill, to become available, and only if no such agent becomes available, resorting to routing the interaction request to an agent having the necessary skill as a secondary skill, if one is available. The dashed line in FIG. 2B identifies the corresponding routing path, from the first queue Q1 to the second pool of agents, as being the less preferred routing path, to be attempted only if attempts to route within the preferred routing path, from the first queue Q1 to the first pool of agents, does not succeed within the allocated wait time.

The routing strategy of FIG. 2A may be referred to as a prompt "N" routing strategy, because of the similarity between the routing pattern and the letter "N" and because of the absence of a delay before attempting to route an interaction, request to the second pool of agents. For analogous reasons the routing strategy of FIG. 2B may be referred to as a delayed "N" routing strategy.

In a variation on a delayed "N" routing strategy, if no agent is available in the second pool of agents, the routing server 20 may again wait, and if after another time interval, e.g., another 10 seconds, no agent having the necessary skill as either a primary or secondary skill has become available, the routing server may resort to routing it to agents of still lower proficiency in the desired skill.

Employing similar notation, FIG. 2C and FIG. 2D illustrate similar alternatives for the case in which the routing server 20 may also try to route interaction requests from the second queue Q2 to the first pool of agents, either immediately (FIG. 2C) or only after first attempting to route them to the second pool of agents during some time interval (FIG. 2D). These routing strategies may be referred to as a prompt "X" routing strategy and a delayed "X" routing strategy, respectively. The routing patterns, e.g., routing strategies, illustrated in FIGS. 2A-2D do not represent the complete set of possible routing patterns; various other patterns such as cascading patterns, or patterns with more than two interaction queues and/or more than two agent pools may also be implemented.

In another embodiment an agent may have an opportunity to specify preferences regarding the types of interactions the agent would prefer to handle and the routing server 20 may take these preferences into account in routing interactions, or the workforce management (WFM) system may set such preferences for an agent.

Figure 3:
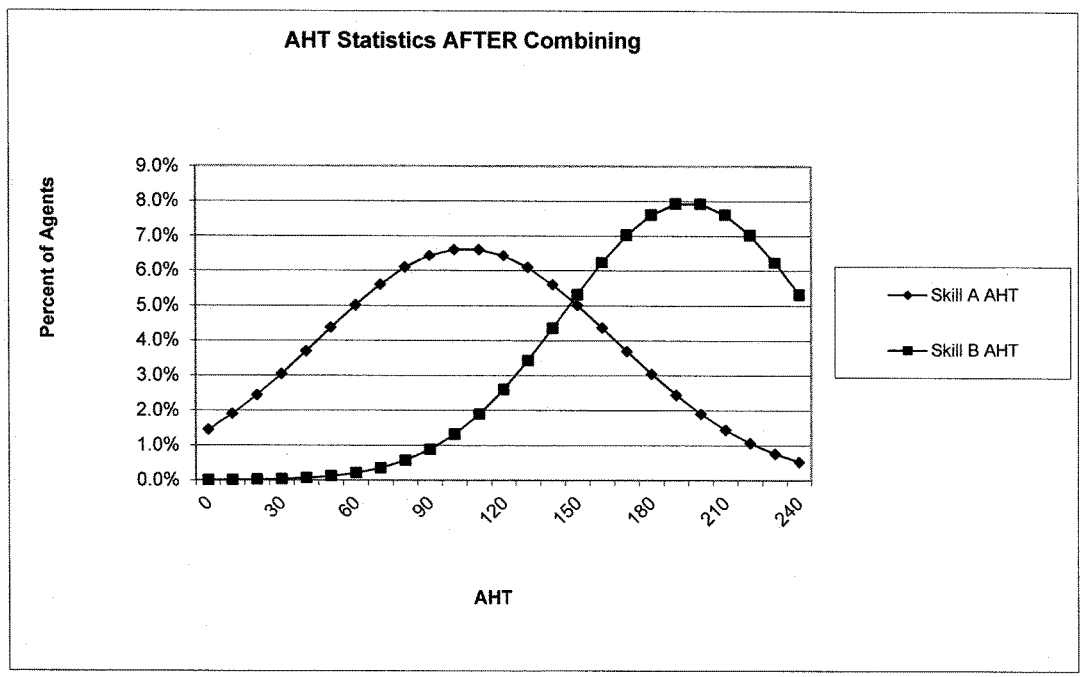
FIG. 3 is a chart illustrating the distributions of average handling times for two different skills for a population of agents, according to an embodiment, of the present invention.

The chart of FIG. 3, shows, for all agents in a pool of agents, a pair of AHT distributions, one for skill A and one for skill B. Each agent contributes to both distribution curves with his individual AHT values for A and B. The generally lower AHT for skill A may be a result of the agents in this pool, having, on average, greater proficiency in skill A than in skill B, or it may be the result of interactions requiring skill B being, on average, more time consuming, even for agents with high proficiency in skill B. An algorithm for optimizing cross skill enablement may take such distributions into account. This may be the case even in a situation in which proficiency is defined without regard to AHT, e.g., in which proficiency is based solely on end user satisfaction, because a measure of AHT may be needed to estimate adequate staffing levels.

The optimal level of cross skill enablement may depend on the routing strategy employed. For example, the delayed "N" routing strategy illustrated in FIG. 2B may, because of the delay, be less likely, for the same level of cross skill enablement, to result in an end user being served by an agent with inferior proficiency, than the prompt "N" routing strategy of FIG. 2A, so that, under the routing strategy illustrated in FIG. 2B, a higher level of cross skill enablement may be optimal than under the routing strategy of FIG. 2A.

Figure 4:
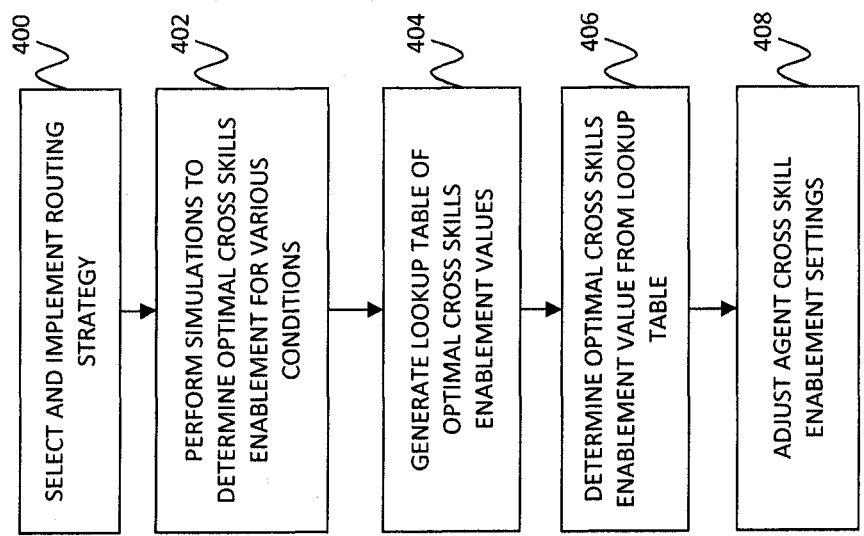
FIG. 4 is a flow chart for a method for setting agent cross skill enablement levels according to an embodiment of the present, invention.

FIG. 4 is flow chart of a method for adjusting agent cross skill enablement settings in a contact center. As a preliminary act 400 during configuring of the contact center, a routing strategy may be selected. Simulations may be performed, in an act 402, to determine the optimal cross skill enablement for the routing strategy and for various circumstances, e.g., the number of agents available, the proficiency of each agent at each of a number of skills, and the rates of incoming interaction requests requiring each of various skills. A lookup table may be created, in an act 404, summarizing the optimal cross skill enablement tor a selected set of values of other factors. During or before operation of the contact center, the optimum cross skill enablement levels may be determined, in an act 406, from the lookup table, for anticipated or current conditions in the contact center, and, in an act 408, agent cross skill enablement may be adjusted accordingly.

Figure 5A:
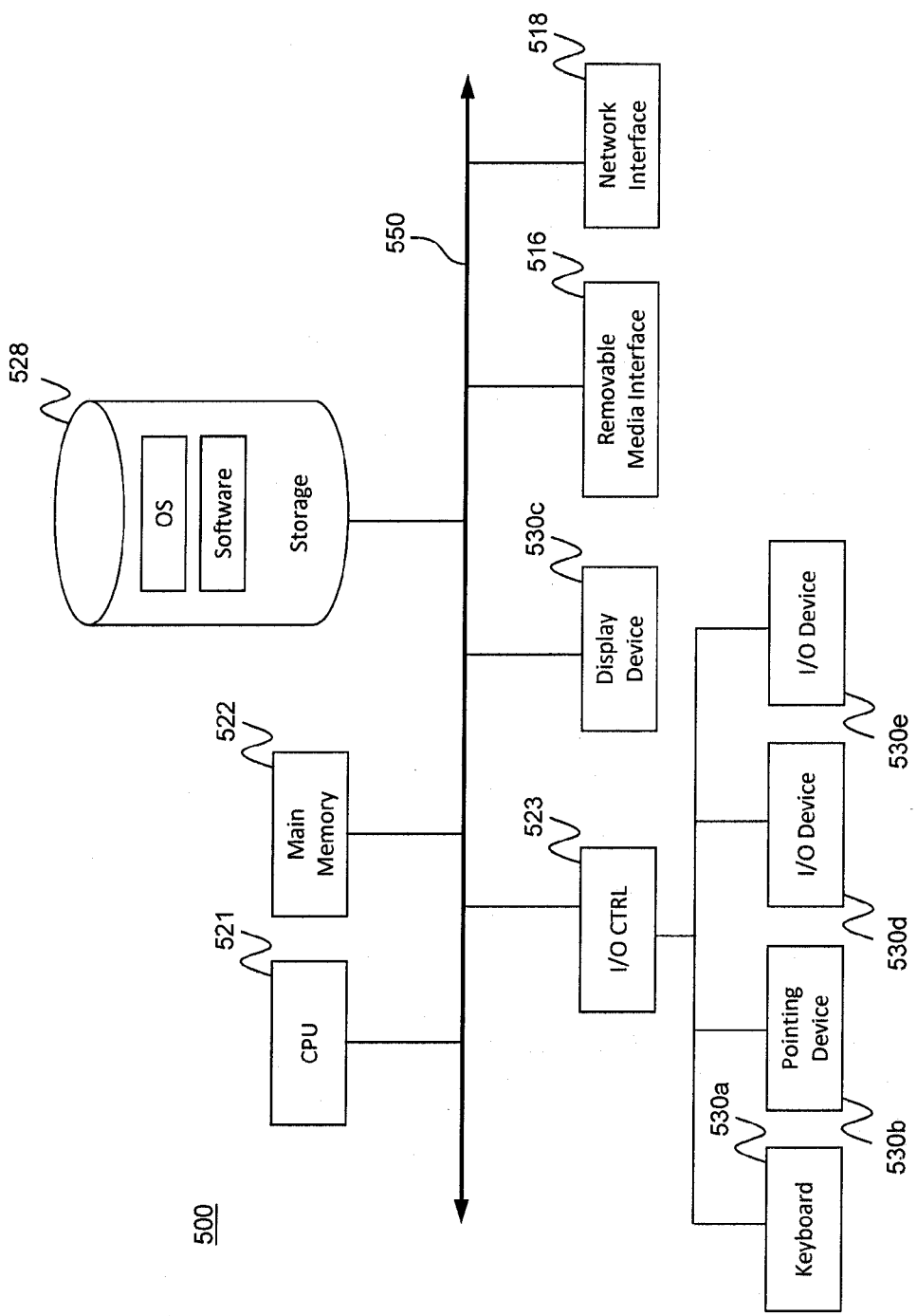
FIG. 5A is a block diagram of a computing device according to an embodiment of the present invention.
Figure 5B:
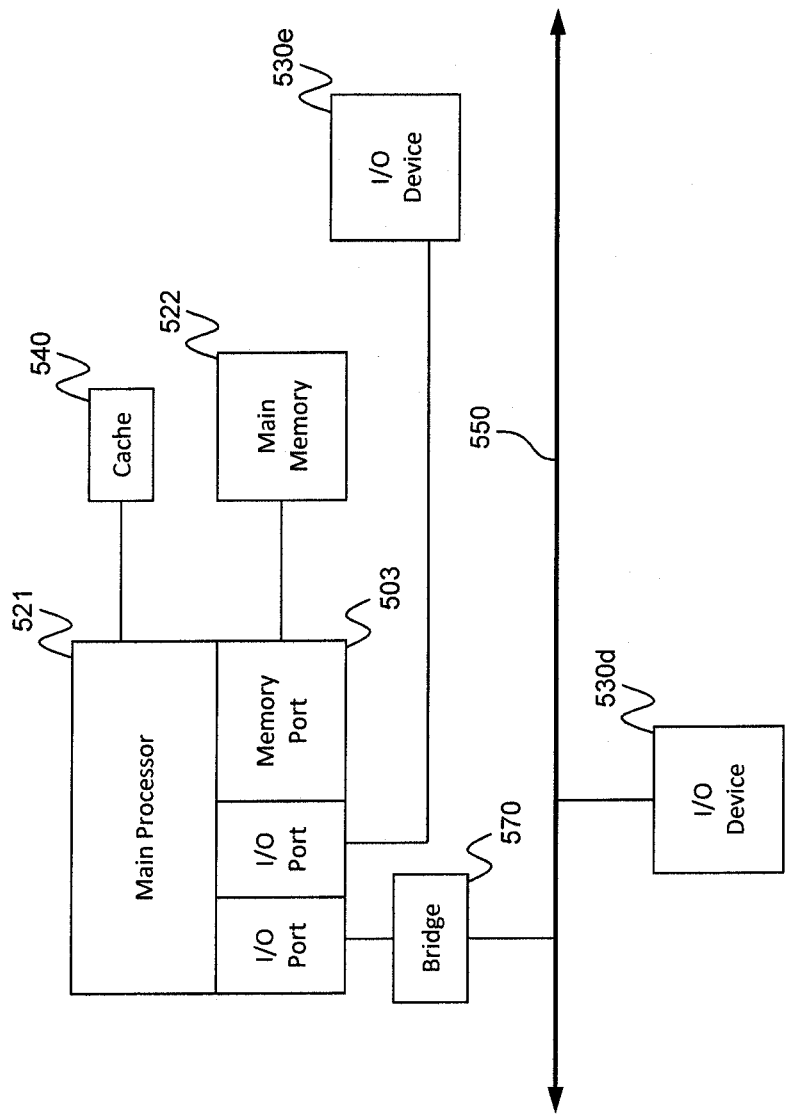
FIG. 5B is a block, diagram of a computing device according to an embodiment of the present invention.

FIG. 5A and FIG. 5B depict block diagrams of a computing device 500 as may be employed in exemplary embodiments of the present invention. As shown in FIG. 5A and FIG. 5B, each computing device 500 includes a central processing unit 521, and a main memory unit 522. As shown in FIG. 5A, a computing device 500 may include a storage device 528, a removable media interlace 516, a network interface 518, an input/output (I/O) controller 523, one or more display devices 530c, a keyboard 530a and a pointing device 530b, such as a mouse. The storage device 528 may include, without limitation, storage for an operating system and software. As shown in FIG. 5B, each computing device 500 may also include additional optional elements, such as a memory port 503, a bridge 570, one or more additional input/output devices 530d, 530e and a cache memory 540 in communication with the central processing unit 521. Input/output devices, e.g., 530a, 530b, 530d, and 530e, may be referred to herein using reference numeral 530.

The central processing unit 521 is any logic circuitry that responds to and processes instructions fetched from the main memory unit 522. It may be implemented, for example, in an integrated circuit, in the form of a microprocessor, microcontroller, or graphics processing unit (GPU), or in a field-programmable gate array (FPGA) or application-specific integrated circuit (ASIC). Main memory unit 522 may be one or more memory chips capable of storing data and allowing any storage location to be directly accessed by the central processing unit 521. In the embodiment shown in FIG. 5A, the central processing unit 521 communicates with main memory 522 via a system bus 550. FIG. 5B depicts an embodiment of a computing device 500 in which the central processing unit 521 communicates directly with main memory 522 via a memory port 503.

FIG. 5B depicts an embodiment in which the central processing unit 521 communicates directly with cache memory 540 via a secondary bus, sometimes referred to as a backside bus. In other embodiments, the central processing unit 521 communicates with cache memory 540 using the system bus 550. Cache memory 540 typically has a faster response time than main memory 522. In the embodiment shown in FIG. 5A, the central processing unit 521 communicates with various I/O devices 530 via a local system bus 550. Various buses may be used as a local system bus 550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 530c, the central processing unit 521 may communicate with the display device 530c through an Advanced Graphics Port (AGP). FIG. 5B depicts an embodiment of a computer 500 in which the central processing unit 521 communicates directly with I/O device 530e. FIG. 5B also depicts an embodiment in which local busses and direct communication are mixed: the central processing unit 521 communicates with I/O device 530d using a local system bus 550 while communicating with I/O device 530e directly.

A wide variety of I/O devices 530 may be present in the computing device 500. Input devices include one or more keyboards 530a, mice, trackpads, trackballs, microphones, and drawing tablets. Output devices include video display devices 530c, speakers, and printers. An I/O controller 523, as shown in FIG. 5A, may control the I/O devices. The I/O controller may control one or more I/O devices such as a keyboard 530a and a pointing device 530b, e.g., a mouse or optical pen.

Referring again to FIG. 5A, the computing device 500 may support one or more removable media interlaces 516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 530 may be a bridge between the system bus 550 and a removable media interface 516.

The removable media interface 516 may for example be used for installing software and programs. The computing device 500 may further comprise a storage device 528, such as one or more hard disk drives or hard, disk drive arrays, for storing an operating system and other related software, and for storing application software programs. Optionally, a removable media interface 516 may also be used as the storage device. For example, the operating system and the software may be run from a bootable medium, for example, a bootable CD.

In some embodiments, the computing device 500 may comprise or be connected to multiple display devices 530c, which each may be of the same or different type and/or form. As such, any of the I/O devices 530 and/or the I/O controller 523 may comprise any type and/or form of suitable hardware, software, or combination of hardware and software to support, enable or provide for the connection to, and use of, multiple display devices 530c by the computing device 500. For example, the computing device 500 may include any type and/or form of video adapter, video card, driver, and/or library to interface, communicate, connect or otherwise use the display devices 530c. In one embodiment, a video adapter may comprise multiple connectors to interface to multiple display devices 530c. In other embodiments, the computing device 500 may include multiple video adapters, with each video adapter connected to one or more of the display devices 530c. In some embodiments, any portion of the operating system of the computing device 500 may be configured for using multiple display devices 530c. In other embodiments, one or more of the display devices 530c may be provided by one or more other computing devices, connected, for example, to the computing device 500 via a network. These embodiments may include any type of software designed and constructed to use the display device of another computing device as a second display device 530c for the computing device 500. One of ordinary skill in the art will recognize and appreciate the various ways and embodiments that a computing device 500 may be configured to have multiple display devices 530c.

A computing device 500 of the sort depicted in FIG. 5A and FIG. 5B may operate under the control of an operating system, which controls scheduling of tasks and access to system resources. The computing device 500 may be running any operating system, any embedded operating system, any real-time operating system, any open source operating system, any proprietary operating system, any operating systems for mobile computing devices, or any other operating system capable of running on the computing device and performing the operations described herein.

The computing device 500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 500 may have different processors, operating systems, and input devices consistent with the device.

In other embodiments the computing device 500 is a mobile device, such as a Java-enabled cellular telephone or personal digital assistant (PDA), a smart phone, a digital audio player, or a portable media player. In some embodiments, the computing device 500 comprises a combination of devices, such as a mobile phone combined with a digital audio player or portable media player.

Figure 5D:
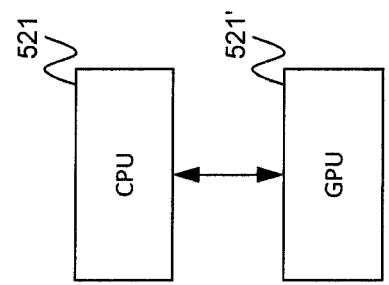
FIG. 5D is a block diagram of a computing device according to an embodiment of the present invention.
Figure 5C:
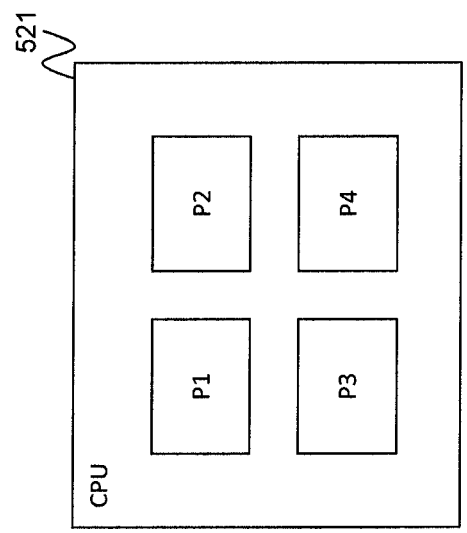
FIG. 5C is a block diagram of a computing device according to an embodiment of the present invention.

As shown in FIG. 5C, the central processing unit 521 may comprise multiple processors P1, P2, P3, P4, and may provide functionality for simultaneous execution of instructions or for simultaneous execution of one instruction on more than one piece of data. In some embodiments, the computing device 500 may comprise a parallel processor with, one or more cores. In one of these embodiments, the computing device 500 is a shared memory parallel device, with multiple processors and/or multiple processor cores, accessing all available memory as a single global address space. In another of these embodiments, the computing device 500 is a distributed memory parallel device with multiple processors each accessing local memory only. In still another of these embodiments, the computing device 500 has both some memory which is shared and some memory which may only be accessed by particular processors or subsets of processors. In still even another of these embodiments, the central processing unit 521 comprises a multicore microprocessor, which combines two or more independent processors into a single package, e.g., into a single integrated circuit (IC). In one exemplary embodiment, depicted in FIG. 5D, the computing device 500 includes at least one central processing unit 521 and at least one graphics processing unit 521'.

In some embodiments, a central processing unit 521 provides single instruction, multiple data (SIMD) functionality, e.g., execution of a single instruction simultaneously on multiple pieces of data. In other embodiments, several processors in the central processing unit 521 may provide functionality for execution of multiple instructions simultaneously on multiple pieces of data (MIMD). In still other embodiments, the central processing unit 521 may use any combination of SIMD and MIMD cores in a single device.

Figure 5E:
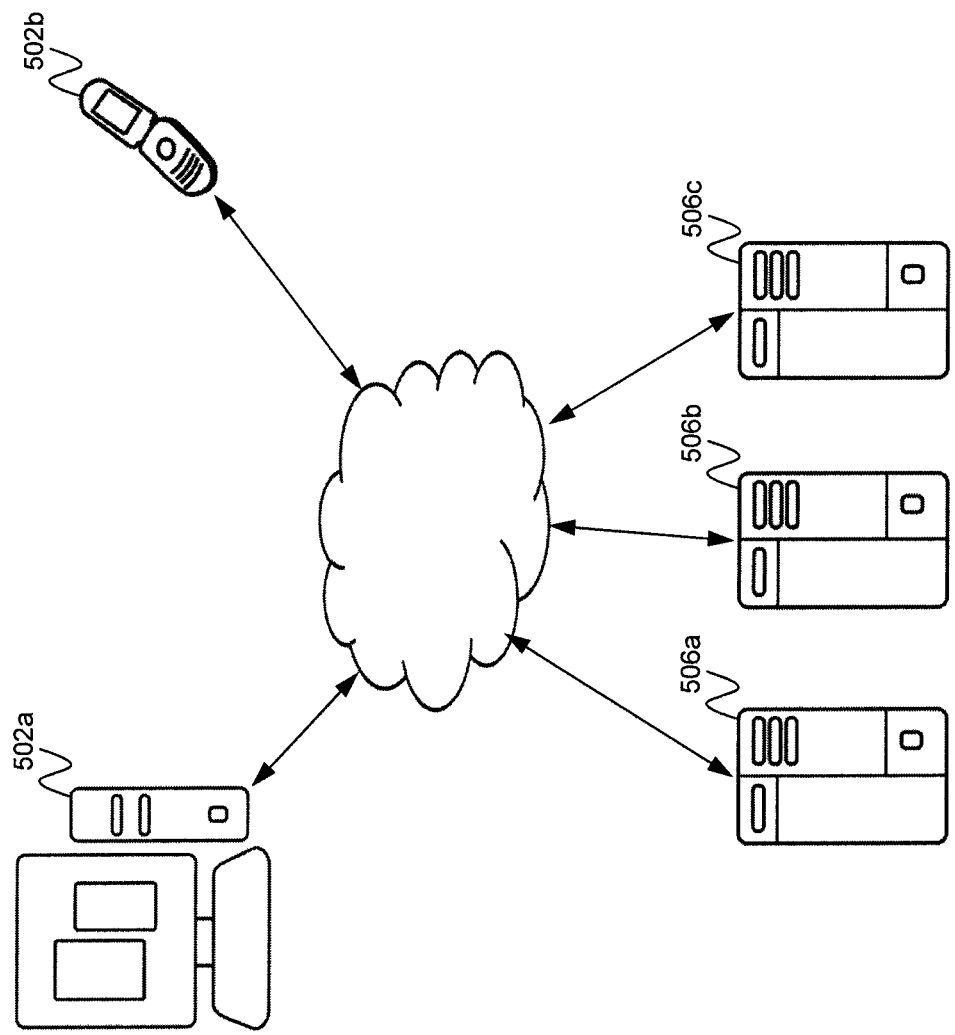
FIG. 5E is a block diagram of a network environment including several computing devices according to an embodiment of the present invention.

A computing device may be one of a plurality of machines connected by a network, or it may comprise a plurality of machines so connected. FIG. 5E shows an exemplary network environment. The network environment comprises one or more local machines 502a, 502b (also generally referred to as local machine(s) 502, client(s) 502, client node(s) 502, client machine(s) 502, client computers) 502, client device(s) 502, endpoint(s) 502, or endpoint node(s) 502) in communication with one or more remote machines 506a, 506b, 506c (also generally referred to as server machine(s) 506 or remote machine(s) 506) via one or more networks 504. In some embodiments, a local machine 502 has the capacity to function as both a client node seeking access to resources provided by a server machine and as a server machine providing access to hosted, resources for other clients 502a, 502b. Although only two clients 502 and three server machines 506 are illustrated in FIG. 5E, there may, in general, be an arbitrary number of each. The network 504 may be a local-area network (LAN), e.g., a private network such as a company Intranet a metropolitan area network (MAN), or a wide area network (WAN), such as the Internet, or another public network, or a combination thereof.

The computing device 500 may include a network interface 518 to interface to the network 504 through a variety of connections including, but not limited to, standard telephone tines, local-area network (LAN), or wide area network (WAN) links, broadband connections, wireless connections, or a combination of any or all of the above. Connections may be established using a variety of communication protocols. In one embodiment, the computing device 500 communicates with other computing devices 500 via any type and/or form of gateway or tunneling protocol such as Secure Socket Layer (SSL) or Transport Layer Security (TLS). The network interface 518 may comprise a built-in network adapter, such as a network interface card, suitable for interlacing the computing device 500 to any type of network capable of communication and performing the operations described herein. An I/O device 530 may be a bridge between the system bus 550 and an external communication bus.

Although exemplary embodiments of a system and method for activities assignment optimization in a multi-skill contact center have been specifically described and illustrated herein, many modifications and variations will be apparent to those skilled in the art. Accordingly, it is to be understood that a system and method for activities assignment optimization in a multi-skill contact center constructed according to principles of this invention may be embodied other than as specifically described herein. The invention is also defined in the following claims, and equivalents thereof.

What is claimed is:

1. A system, comprising:
   a processor; and
   a memory, wherein the memory has stored thereon instructions that, when executed by the processor, cause the processor to:
   run a simulation of routing a plurality of interactions warranting a first skill, to a first pool of agents and a second pool of agents, wherein the first skill is enabled as a primary skill for the first pool of agents and as a secondary skill for the second pool of agents;
   predict a contact center performance based on the simulation;
   adjust the first or second pool of agents based on the predicted contact center performance;

identify an interaction warranting the first skill;
determine how many agents in the second pool of agents are employing the first skill; and
in response to the determining, block the interaction from being routed to an agent in the second pool of agents; and
a switch coupled to the processor and configured to route the interaction to an available agent in the first and second pool of agents other than the blocked agent.

2. The system of claim 1, wherein the contact center performance is defined by a metric relating to one or more service objectives.

3. The system of claim 2, wherein the metric is selected from the group consisting of: an average speed of answer (ASA), an end user experience, and a fraction of interaction requests answered within a predetermined time period.

4. The system of claim 2, comprising storing a number relating to agents in the first and second pools, in a lookup table.

5. The system of claim 1, wherein the executing of the simulation includes executing the simulation on an assumption of a number of agents in the first pool and a number of agents in the second pool.

6. The system of claim 1, wherein the executing of the simulation comprises executing the simulation using an assumption that incoming interaction requests arrive in at random points in time, the random points in time being characterized by a Poisson distribution.

7. The system of claim 1, wherein the executing of the simulation comprises executing the simulation using an assumption that agent handling times for interactions take random values, the random values being characterized by an exponential distribution.

8. The system of claim 1, wherein the interaction is routed according to a routing strategy configured to route the interaction to an earliest-available agent from the first pool of agents or the second pool of agents.

9. The system of claim 1, wherein the interaction is routed according to a routing strategy configured to wait a preset amount of time prior to routing the interaction to an agent in the second pool of agents in response to determining that agents in the first pool of agents are not available.

10. A method, comprising:
running, by a processor, a simulation of routing a plurality of interactions warranting a first skill, to a first pool of agents and a second pool of agents, wherein the first skill is enabled as a primary skill for the first pool of agents and as a secondary skill for the second pool of agents;
predicting, by the processor, a contact center performance based on the simulation;
adjusting, by the processor, the first or second pool of agents based on the predicted contact center performance;
identifying, by the processor, an interaction warranting the first skill;
determining, by the processor, how many agents in the second pool of agents are employing the first skill;
in response to the determining, blocking, by the processor, the interaction from being routed to an agent in the second pool of agents; and
routing, by a switch coupled to the processor, the interaction to an available agent in the first and second pool of agents other than the blocked agent.

11. The method of claim 10, wherein the contact center performance is defined by a metric relating to one or more service objectives.

12. The method of claim 11, wherein the metric is selected from the group consisting of: an average speed of answer (ASA), an end user experience, and a fraction of interaction requests answered within a predetermined time period.

13. The method of claim 11, comprising storing a number relating to agents in the first and second pools, in a lookup table.

14. The method of claim 10, wherein the executing of the simulation includes executing the simulation on an assumption of a number of agents in the first pool and a number of agents in the second pool.

15. The method of claim 10, wherein the executing of the simulation comprises executing the simulation using an assumption that incoming interaction requests arrive in at random points in time, the random points in time being characterized by a Poisson distribution.

16. The method of claim 10, wherein the executing of the simulation comprises executing the simulation using an assumption that agent handling times for interactions take random values, the random values being characterized by an exponential distribution.

17. The method of claim 10, wherein the interaction is routed according to a routing strategy configured to route the interaction to an earliest-available agent from the first pool of agents or the second pool of agents.

18. The method of claim 10, wherein the interaction is routed according to a routing strategy configured to wait a preset amount of time prior to routing the interaction to an agent in the second pool of agents in response to determining that agents in the first pool of agents are not available.

* * * * *